United States Patent [19]

Miki et al.

[11] Patent Number: 4,582,408
[45] Date of Patent: Apr. 15, 1986

[54] FILM INFORMATION READING DEVICE OF A CAMERA

[75] Inventors: Yukio Miki, Sakai; Toshio Yamaki, Osaka, both of Japan

[73] Assignee: Minolta Camera Kabushiki Kaisha, Osaka, Japan

[21] Appl. No.: 692,721

[22] Filed: Jan. 18, 1985

[30] Foreign Application Priority Data

Jan. 27, 1984 [JP] Japan .................. 59-13792
Jul. 9, 1984 [JP] Japan ................. 59-142832

[51] Int. Cl.⁴ .............................................. G03B 7/24
[52] U.S. Cl. ...................................................... 354/21
[58] Field of Search ......................................... 354/21

[56] References Cited

U.S. PATENT DOCUMENTS

| | | | |
|---|---|---|---|
| 4,024,557 | 5/1977 | Aoyama et al. | 354/21 X |
| 4,074,286 | 2/1978 | Suzuki | 354/21 |
| 4,200,371 | 4/1980 | Suzuki et al. | 354/268 X |
| 4,309,089 | 1/1982 | Harvey | 354/21 |

Primary Examiner—William B. Perkey
Attorney, Agent, or Firm—Watson, Cole, Grindle & Watson

[57] ABSTRACT

A film information reading device of a camera adapted for use with a film cartridge having on an outer periphery film information pattern consisting of a combination of a plurality of conductive or insulated code areas, including a chamber wall for defining a film loading chamber, and a plurality of electrical contact members which are in contact with the code areas on the film cartridge, when the film cartridge is loaded into the camera. The film information, such as film sensitive speed, can be read out by detecting whether the contact members are in contact with the conductive or insulative code areas.

The chamber wall (11c, 11d, 21) has an opening (21a) opened toward the inside the film chamber (12). A base member (22) is slidably fitted within the opening (21a) so as to be slidingly movable between a projected position and a retracted position. The base member (22) has a plurality of holes (22a) extending in a sliding direction of the same, into which the contact members (23) are slidably fitted so as to be slidingly movable between their projected and retracted positions. The base member (22) and the respective contact members (23) are urged by springs (24) toward their inwardly projected position, so that the contact members (23) are in contact with the respective corresponding code areas provided on the film cartridge (1), when the latter is loaded in the chamber (12).

9 Claims, 20 Drawing Figures

FILM INFORMATION READING DEVICE OF A CAMERA

BACKGROUND OF THE INVENTION

1. Field of the Invention

The present invention relates to a film information reading device of a camera, and more particularly, to such a device capable of reading out film information such as the film sensitive speed or number of frames, when the camera is loaded with a film cartridge having on its outer surface a code pattern representing this information.

2. Description of the Related Art

A roll film cartridge having on the outer periphery thereof a code pattern consisting of a plurality of conductive or insulated code areas representing film information, has been recently developed and proposed together with a camera adaptable to use such a film cartridge. FIGS. 1A and 1B illustrate a film cartridge having a code pattern consisting of twelve code areas 1a, through which film information such as the film sensitivity, number of frames, and allowable exposure limit (i.e. exposure range), are automatically transmitted to an electrical circuit in the camera. In order to read this film information through the code pattern, a reading device must be provided in a film cartridge chamber of the camera in such a manner that the code pattern is in contact with the reading device when the film cartridge 1 is loaded into the camera. The film cartridge 1 has upper and lower cover caps 1b having a larger diameter than the outer peripheral surface on which the code pattern is formed. Therefore, electrical contacts of the reading device in the camera must be inwardly projected from the inner wall of the film chamber by at least a difference (h), as shown in FIG. 1B.

On the other hand, as shown in FIG. 2, the film cartridge chamber 12 of a camera is provided with a film rewind fork 13, which is projected into the film chamber in such a manner that it engages with a key formed at a shaft end of the film cartridge when the film cartridge is loaded into the camera. In many cameras, the film rewind fork 13 is designed to retract upwardly into the camera body so as not to interfere with the loading or unloading of the film cartridge. However, in some cameras, the rewind fork 13 is designed not to retract upwardly, because the space of the camera body is used for other purposes. For example, in many cameras having an automatic film rewinding mechanism, the rewinding fork 13 is usually designed not to retract. In these cameras, the film cartridge must be loaded by inserting it in the axial direction thereof. Consequently, the cartridge is inserted obliquely in the direction indicated by A in FIG. 2 from a position below and slightly behind the film chamber 12.

Providing these cameras with the above-mentioned film information reading device will give rise to a problem wherein, when the film cartridge is obliquely inserted, the cap edge thereof may interfere with the electrical contacts of the code reading device, since they are projected as mentioned above, and the film cartridge loading may not proceed smoothly. To obviate this problem, it is suggested to provide movable electrical contacts which retract when the edge of film cartridge comes into contact therewith. However, this is not sufficient to completely obviate the above-mentioned problem, since this solution is possible only when the amount of the projection of the electrical contacts is very small, since otherwise the edge of the film cartridge would laterally come into contact with the contacts, and therefore, the contacts could not retract. In fact, the electrical contacts must project for 1.5 mm to 2.0 mm to attain a reliable electrical connection. However, the above-mentioned interference with the contacts cannot be prevented with this amount of projection.

U.S. Pat. Nos. 4,024,557 and 4,074,286 disclose a system for reading film information such as film speed, represented by a code pattern provided on a film cartridge, through electrical contacts in a camera body. U.S. Pat. Nos. 4,200,371 and 4,431,283 further disclose pivotable contact members which come into contact with a code pattern on a film cartridge when the cartridge is loaded or a film chamber is closed with a back cover.

SUMMARY OF THE INVENTION

Accordingly, a principal object of the present invention is to provide a film information reading device of a camera, with which it is possible to smoothly insert a film cartridge into a film chamber of the camera, even if the cartridge must be obliquely inserted in the axial direction thereof, and to establish a reliable contact between the code areas of the film cartridge and electrical contact members in the camera so as to exactly read the film information, such as film sensitive speed, number of frames, and allowable exposure limit.

Another object of the present invention is to provide a film information reading device of a camera capable of establishing a reliable electrical connection for exactly reading the code areas representing film information, even if the code areas of the cartridge are stained or partially covered with dust or a foreign substance.

According to the present invention, there is provided a film information reading device of a camera adapted to use with a film cartridge having on an outer periphery thereof a film information code pattern consisting of a combination of a plurality of conductive or insulated code areas, comprising: means for defining a chamber for loading therein a film cartridge in a predetermined position, this means including a chamber wall having an opening opened toward the inside of the chamber; a base member having an inside surface and slidably fitted within the opening, the base member being slidingly movable between a projected position at which the inside surface thereof is projected inwardly from the chamber wall by a certain distance and a retracted position at which the inside surface is retracted in the opening, the base member having a plurality of holes each extending in a sliding direction of the base member; a plurality of contact members each having an inside end and slidably fitted within each of the plurality of holes, each contact member being slidingly movable between a projected position at which the inside end is projected inwardly from the inside surface of the base member by a certain small distance and a retracted position at which the inside end is retracted in the hole; means for urging the base member and the respective contact members toward their inwardly projected positions, so that the contact members come in contact with the respective corresponding code areas of the film information code pattern provided on the film cartridge when the latter is loaded in the chamber; an electrical unit for reading the film information by detecting whether the contact members are in contact with the conductive or insulated code areas; and, means for electrically connecting each contact member to the electrical unit.

Preferably, the distance by which each contact member is projected, in its projected position, from the inside surface of the base member is smaller than the distance by which the base member is projected, in its projected position, from the film chamber wall.

According to the present invention, although the projected distance of each contact member from the base member is small enough, a desired stroke can be obtained by the slidable base member. Therefore, a cap edge of the film cartridge will not interfere with the contact members, which, therefore, will not prevent the loading of film cartridge when the cartridge is obliquely inserted into the film chamber in the axial direction thereof; particularly in the case of a camera having a film rewinding fork which cannot retract into the camera body. Therefore, each of the contact members are in reliable contact with each of the code areas of the film information code pattern provided on the film cartridge, when the latter is completely loaded into the camera.

DESCRIPTION OF THE PREFERRED EMBODIMENTS

Figure 1A:
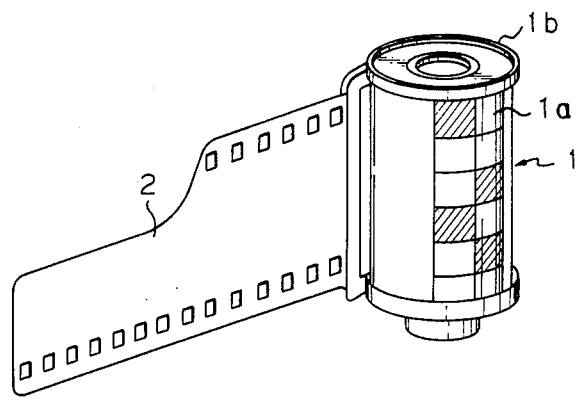
FIG. 1A is a perspective view of a film cartridge, known in the art, having thereon code areas representing film information.
Figure 1B:
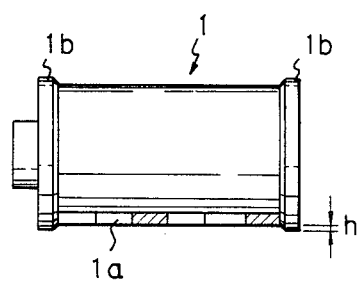
FIG. 1B is an elevational view of the film cartridge of FIG. 1.
Figure 2:
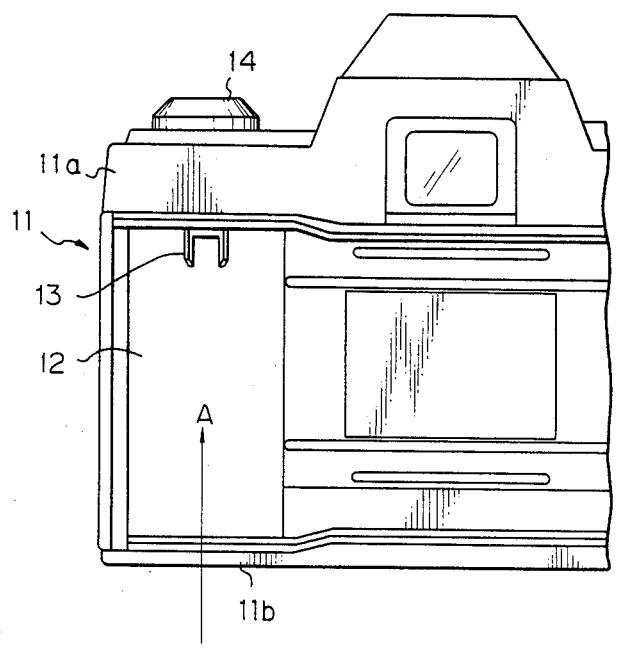
FIG. 2 is a partial rear view of a conventionally known camera with a back cover removed.
Figure 3:
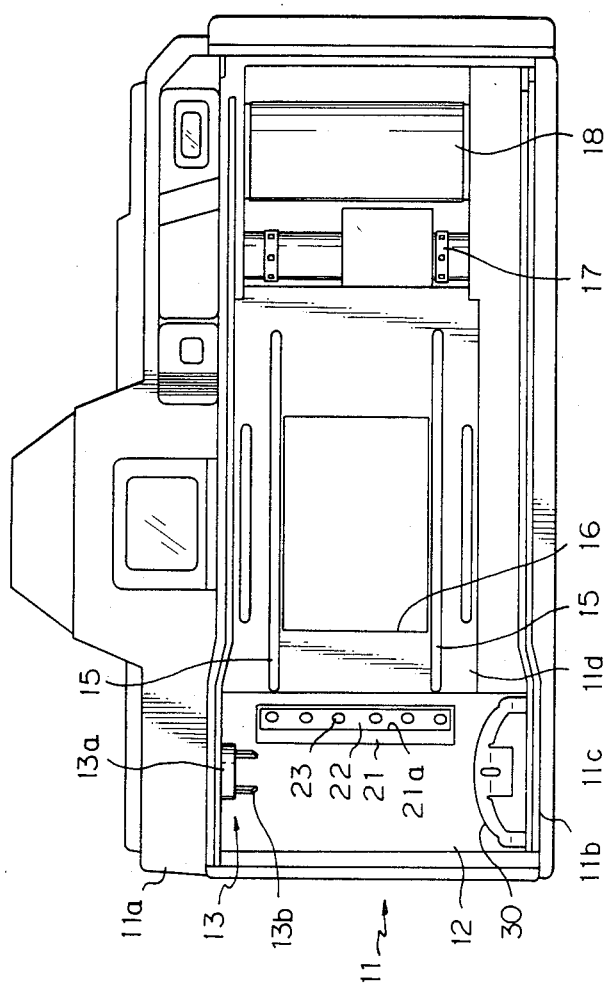
FIG. 3 is a rear view of a camera employing a film information reading device according to the present invention with a back cover removed.

Referring now to FIGS. 3 through 8, there is shown a first embodiment of the present invention which is adaptable for use with a film cartridge having a code pattern representing the film information, as illustrated in FIG. 1(A). FIG. 3 is a rear view of a camera with the back cover thereof removed. The camera body 11 is provided at the left hand with a film cartridge chamber 12 and at the right hand with film take-up sprockets 17 and a spool 18, with an exposure opening 16 therebetween.

The film is drawn from the cartridge loaded in the film chamber 12, is passed through and across the exposure opening 16 along guide rails 15 at the rear side of the camera, is then taken-up by the sprocket 17, and is wound onto the cylindrical spool 18.

As the top of the film chamber 12 there is a fork 13 which engages with a key formed at one end of a shaft of the film cartridge loaded in the film chamber to rewind the film after it is fully or partially used. The fork 13 consists of a base portion 13a and a pair of claws 13b which are spring-loaded to urge them to extend downward and which can be retracted into the base portion 13a against the spring-loaded urging force. However, where an automatic film winding device is provided, the base portion 13a can no longer retract into the camera body 11, since the body portion above the fork 13 is occupied by a substrate for an electric circuit and the like, not illustrated in the drawing. On the other hand, the claw portion 13b is still retractable, and the keyed-shaft of the film cartridge can be readily engaged with the claw portion 13b after the film is slightly advanced; this engagement is not always exact just when the cartridge is loaded.

As mentioned above, the base portion 13a of the fork 13 is not retractable, so that a film cartridge cannot be inserted into the film chamber 12 in the direction perpendicular with respect to the film cartridge shaft, i.e., the cartridge cannot be inserted from behind and directly forward of the camera body 11, but must be inserted upward and forward in an oblique direction from below and behind the camera.

Figure 4:
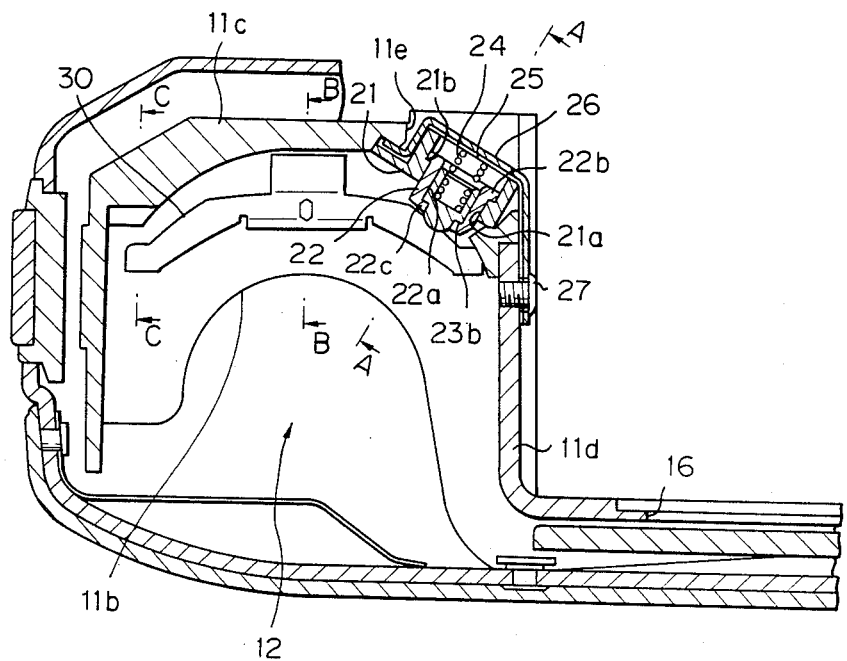
FIGS. 4 and 5 are partial horizontal cross-sectional views of the embodiment of FIG. 3.

In order that the cartridge can be easily inserted, the bottom portion 11b of the film chamber 12 is formed with U-shaped recess, as illustrated in FIG. 4. In addition, as shown in FIGS. 3, 4, 6 through 9, and 11, in the bottom portion 11b in the film chamber 12, there is a spring 30 for pushing against a cartridge, this spring 30 being secured at its respective left and right ends 30a (FIGS. 6 and 8) to the camera body and pushing the film cartridge upward by its resilient deformation so as to hold the film cartridge at a predetermined position in the film chamber 12, when the loading operation thereof is completed, as shown in FIG. 8. In this position, a top end 30b of the spring 30 is retracted into a hole 31 in the camera body.

The film chamber 12 is provided with an elongated rectangular supporting member 21 forming a part of the chamber wall per se in the up-and-down direction, a base member 22 slidably disposed in an opening 21a formed in the supporting member 21, and a plurality of contact pins 23 slidably inserted into holes 22a formed in the base member 22. These members will be explained in further detail with reference to FIGS. 4 through 6.

Figure 5:
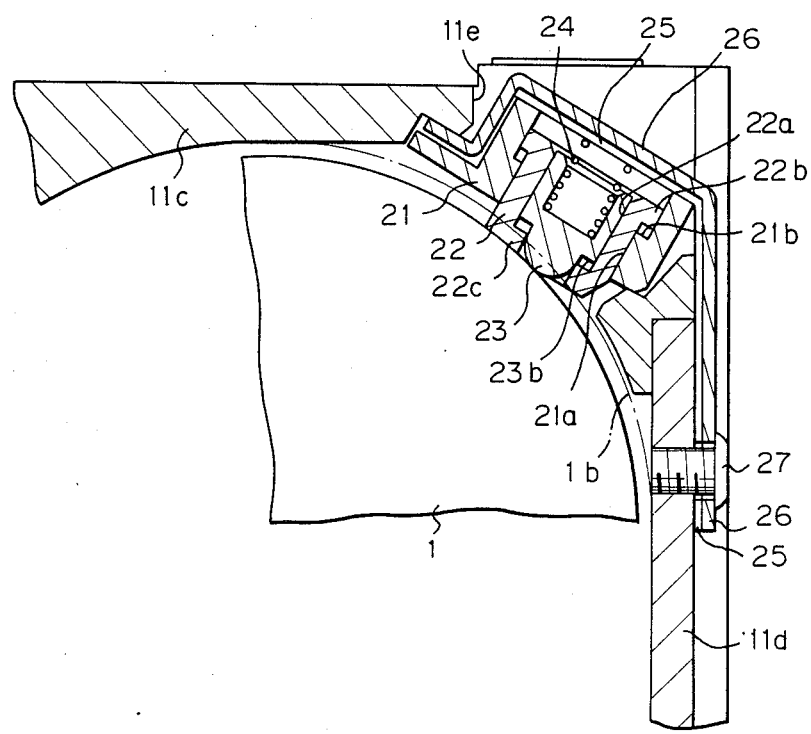
Figure 6:
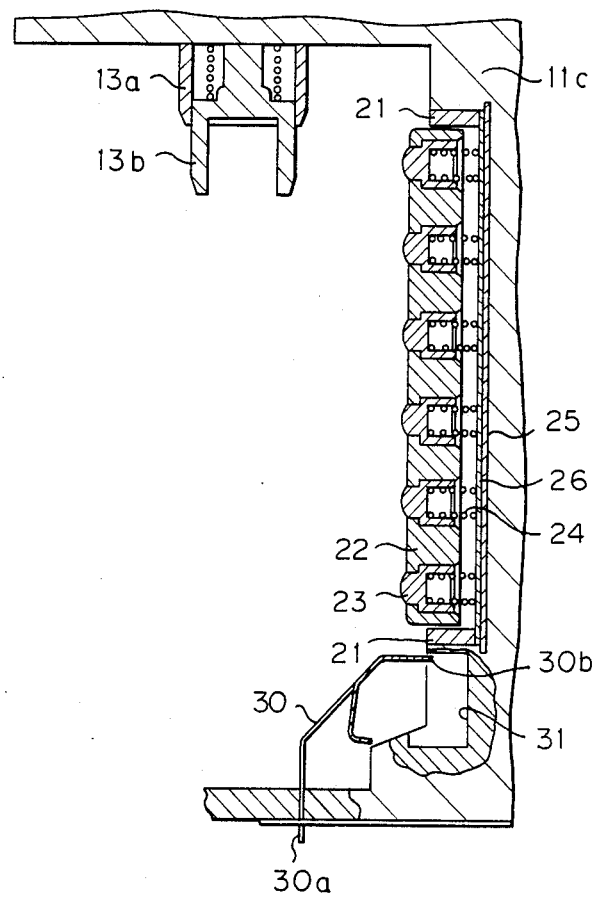
FIGS. 6, 7, and 8 are partial vertical cross-sectional views of a film chamber of the above embodiment, taken along lines A—A (at contact pins 23), B—B (at retraction hole 31), and C—C (at spring end 30a) in FIG. 4, and illustrating the film cartridge loading operation.

FIGS. 4 and 5 are cross-sectional views taken along a horizontal plane of the camera, wherein FIG. 4 illustrates the film cartridge chamber 12 with a back cover closed and a film cartridge being unloaded, while FIG. 5 illustrates a partial enlarged cross-section thereof with a film cartridge being loaded. FIG. 6 is a cross-sectional view of the film chamber 12 taken along a vertical plane of the camera with a film cartridge being unloaded.

As known in the prior art, the camera body 11 is made of a unitary mold consisting of plastic and metal, wherein the portion surrounding the exposure opening requires strength and rigidity and is made of any suitable metal, while the other portions of the camera body are made of plastic material. The wall of the film chamber 12 comprises a front and left side wall 11c made of plastic and a metal side wall 11d adjacent the central portion of the camera.

The film chamber wall is provided at the front side of the camera and slightly adjacent to the central portion thereof with a vertical elongated rectangular opening 11e, into which an elongated rectangular supporting member 21 is fixedly inserted so as to form a part of the film chamber wall per se. The supporting member 21 is provided also with a vertical elongated rectangular opening 21a, which is shaped, in its horizontal cross-section, so that the width thereof is larger at the outside of the film chamber, while smaller at the inside of the film chamber, and provided with inner steps 21b.

A base member 22 is slidably fitted into the smaller cross-sectional area of the opening 21a, along which the base member 22 is capable of sliding toward or away from the inside of the film chamber 12. The base member 22 is also vertically elongated and provided with a plurality of holes 22a each extending in the sliding direction of the base member 12. In this particular embodiment, holes 22a are regularly arranged along a vertical direction of the camera, i.e., the axial direction of the film cartridge. The base member 22 is provided, in its horizontal cross-section and at the outside end in regard to the film chamber, with outer flanges 22b and with inner flanges 22c at the inside end with regard to the film chamber.

Six contact pins 23 made of electrically conductive material are slidably fitted into the respective six holes 22a of the base member 22. The diameter of each of the contact pins 23 is larger at the outside and smaller at the inside with regard to the film chamber, and has a step 23b therebetween. The inner end of the contact pin 23, with regard to the film chamber, has a smooth and rounded convex shape.

The base member 22 and the contact pins 23 are inserted into the opening 21a and respective holes 22a, respectively, from the outside of the film chamber toward the inside thereof, and are then secured thereto through respective springs 24 and a flexible plate 25 by a retaining member 26. The springs 24 serve to urge the respective contact pins 23 toward the inside of the film chamber and to urge the base member 22 via the contact pins 23. In the assembled condition, an inside surface of the base member 22 is protruded from the supporting member 21, i.e., from the inner wall of the film chamber, and inside ends of the contact pins 23 are also protruded from the inside surface of the base member 22, toward the inside of the film chamber; their inward projection is limited by engagement with the step portions 21b of the supporting member 21 with the flanges 22b of the base member 22 and the second flanges 22c of the base member 22 with the steps 23b of the respective contact pins 23. It should be noted that the amount of projection of each contact pin 23 from the base member 22 is small. The springs 24 are made of electrically conductive material so as to electrically connect the contact pins 23 to conductive patterns, not shown, formed on the flexible plate 25, by being in contact at their one ends with the corresponding contact pins 23 and at the other ends thereof with the corresponding patterns.

The flexible plate 25 and the retaining member 26 are rigidly secured at their extensions to the metal wall portion 11d by means of screws 27. Electrical patterns are formed on the flexible plate 25, including a ground pattern which is extended to a portion of the plate fixed by the screw 27, and through which the ground pattern is electrically connected to the metal wall 11d.

The ground pattern as mentioned above is advantageous, since in a hybrid camera body consisting of metal and plastic, unless the metal portion is electrically connected another camera body portion, electrical voltage of the metal portion may change due to the generation of electrical noise around the camera, which may influence the operation of the electrical circuit in the camera, causing the camera to operate erroneously. Therefore, according to the above-mentioned embodiment, the electrical voltage of the metal portion of the hybrid body does not change and the electrical circuit is always kept in a stable condition, because the ground pattern or a wire of low impedance is arranged near the metal portion and electrically connected to the metal body. The electrical connection between the ground pattern of the flexible plate 25 and the metal wall 11d can be also attained by solder welding or through a suitable lead wire or line, in place of the above-mentioned screw 27. It may be also made by directly caulking a part of the flexible plate 25 to the metal wall 11d.

In this embodiment, the film information reading device is located in the vicinity of the metal wall 11d, so that a long ground pattern or lead wire for the ground connection is not necessary. In addition, the convenience of insertion of the film information reading device due to its unitary construction is not prevented by the above-mentioned ground connection.

In this embodiment, the film cartridge is loaded into the film chamber as follows. FIG. 6 is a partial vertical cross-sectional view of the film cartridge chamber, wherein a film cartridge is unloaded. Therefore, the base member 22 and the contact pins 23 are in the projected positions toward the inside of the film chamber.

Figure 7:
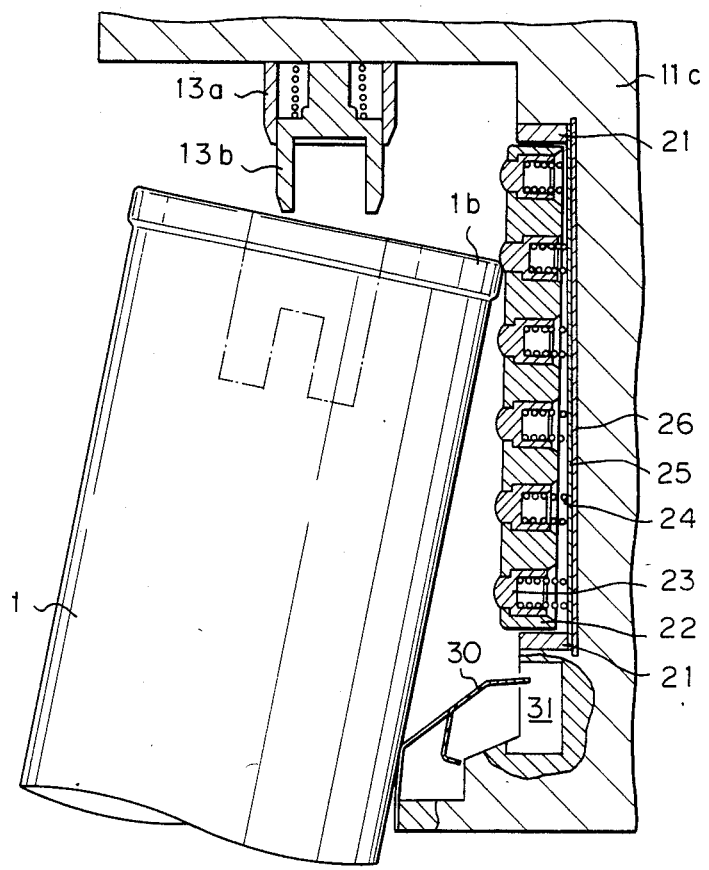
Figure 8:
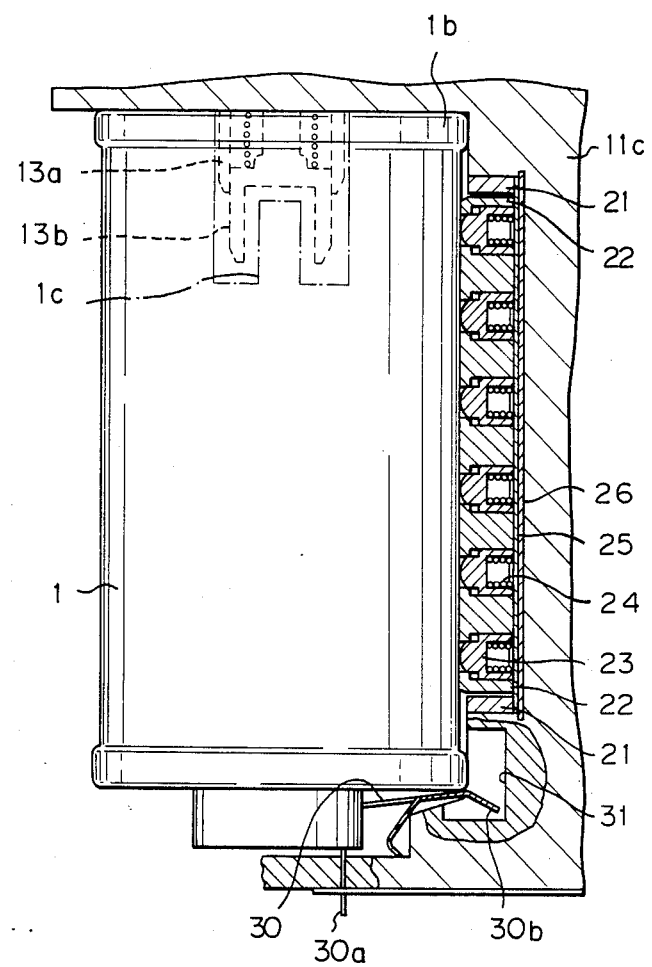

In FIG. 7, when the film cartridge 1 is loaded, the upper cap edge 1b thereof first comes into contact with the base member 22 and pushes the base member 22 together with the contact pins 23 against the springs 24. Then, the upper edge of the film cartridge 1 slides on the base member 22 and comes into contact with one of the contact pins 23. The amount of projection of the contact pins 23 from the base member 22 is small and the head of the pin is smoothly rounded, as mentioned above, so that the edge of the film cartridge 1 is capable of smoothly sliding onto the contact pin 23, which also smoothly retracts into the base member 22. If the cap edge of the film cartridge 1 first come in contact directly with one of the contact pins 23, the latter first retracts into the base member 22 against the spring 24 and the base member 22 is then pushed by the edge 1b of the film cartridge 1.

While the film cartridge 1 is further inserted upwardly, the edge 1b of the film cartridge 1 pushes and passes over the contact pins 23, one by one, and finally a key 1c provided on the upper end of a film cartridge shaft is engaged with the fork 13 in the film chamber, and the film cartridge 1 is completely loaded, as seen in FIG. 8. In this state, as seen in FIGS. 5 and 8, the base member 22 is almost adjacent to or in contact with the peripheral cylindrical surface of the film cartridge 1, and the contact pins 23 are urged into contact with and electrically connected to the respective code areas on the film cartridge, with the help of the springs 24.

Even if the peripheral surface of the film cartridge 1 is somewhat uneven and the base member may not therefore be always firmly in contact with the peripheral surface of the film cartridge 1, each of the contact pins 23 is urged into firm contact with the corresponding area of the film information code pattern on the film cartridge 1 with the help of the springs 24. The contact pins 23 are connected through the conductive springs 24 to the circuit pattern on the flexible plate 25, on which an electrical circuit means for reading the film information by detecting whether the contact pins are in contact with the conductive or insulated code areas is formed so as to generate a signal of the film information for operations such as the automatic exposure setting in the camera.

Arrangements of the code pattern consisting of conductive or insulated code areas on a film cartridge, representing film information, such as film sensitivity in ASA units and the electrical circuit means for electrically detecting the code pattern and reading out the film information are known in the prior art and discussed in publications such as U.S. Pat. No. 4,431,283.

When the film cartridge 1 is unloaded from the film chamber, the upper cap edge 1b of the film cartridge 1 first slides onto the base member 22 and then passes over the heads of the contact pins 23, one by one, and thereafter the unloading of the cartridge is completed. At the initial stage of the unloading of the film cartridge 1, the projected cap edge of the film cartridge 1 can be smoothly moved onto the base member 22, since the base member 22 is largely retracted and the corner of the base member 22 is smooth and rounded in shape.

Figure 9:
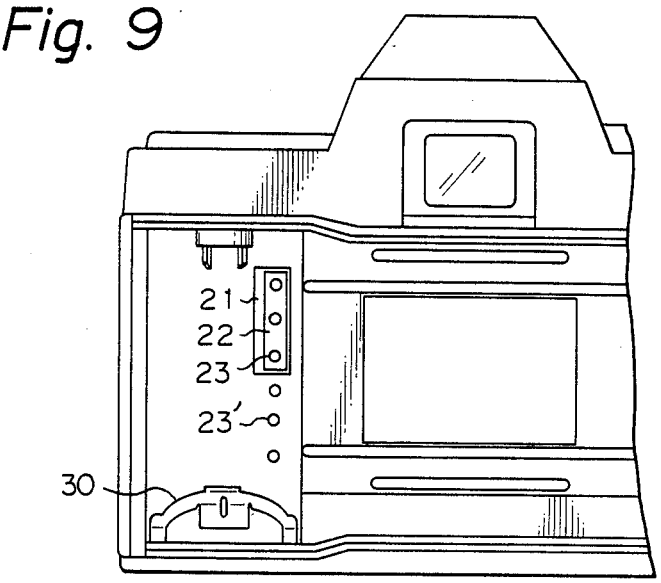
FIG. 9 is a partial rear view of a camera employing a second embodiment of the present invention with a back cover removed.
Figure 10:
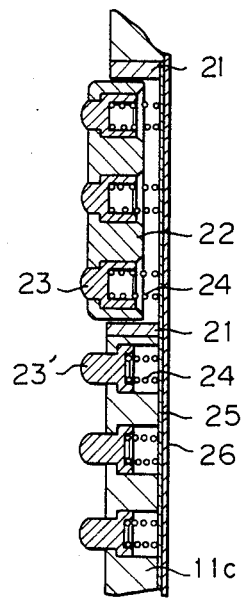
FIG. 10 is a partial vertical cross-sectional view of the second embodiment shown in FIG. 9.

FIGS. 9 and 10 illustrate another embodiment of the present invention, wherein the upper three of six contact pins 23 are constructed in a similar manner as the first embodiment, while lower three contact pins 23' are directly mounted on the inner wall of the film chamber. In this embodiment, as seen in FIG. 10, the lower three pins 23' are projected largely from the inner wall of the film chamber by means of springs 26, since the upper cap edge of the film cartridge comes into contact only with the upper pins, as seen from FIG. 7, when the film cartridge is loaded into or unloaded from the film chamber. Therefore, a base member is not really necessary for the lower contact pins 23'.

Figure 11:
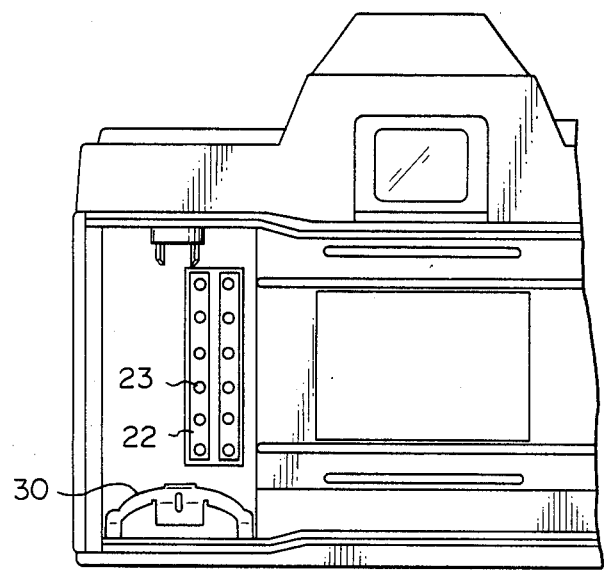
FIG. 11 is a partial rear view of a camera employing a third embodiment of the present invention with a back cover removed.

FIG. 11 illustrates still another embodiment of this invention, wherein there are two slidable base members 22 each slidably carrying six contact pins 23 which are arranged along a vertical line. Therefore, in this embodiment, all the twelve contact pins 23 can come into contact with the twelve code areas, respectively, of film information code pattern on the peripheral surface of a film cartridge. Therefore, greater amount of film information, such as film sensitivity, number of film frames, and allowable exposure limit, can be read out.

FIGS. 12 through 15 illustrate an embodiment of this invention similar to the first embodiment shown in FIGS. 3 through 8, but in this embodiment a pair of contact pins 23 are provided for each of the respective code areas on the film cartridge. That is to say, the base member 22 is provided with twelve holes 22a along a vertical line into which twelve contact pins 23 are slidably inserted, respectively. Each of these twelve contact pins 23 is urged toward the inside of the film chamber 12 by each of twelve springs 24 in a manner similar to that mentioned above. These twelve contact pins 23 are grouped into six pairs thereof and each pair of contact pins are electrically connected through each pair of springs 24 to a single common conductive pattern on the flexible plate 25. On the other hand, each pair of contact pins 23 are intended to come into contact with each single common conductive or insulated area on the film cartridge, when the latter is loaded into the film chamber.

Figure 16:
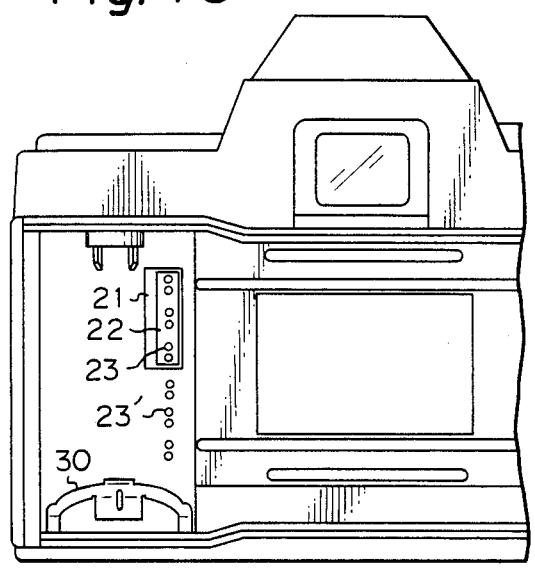
FIG. 16 is a partial rear view illustrating a modified embodiment similar to that of FIG. 9.
Figure 17:
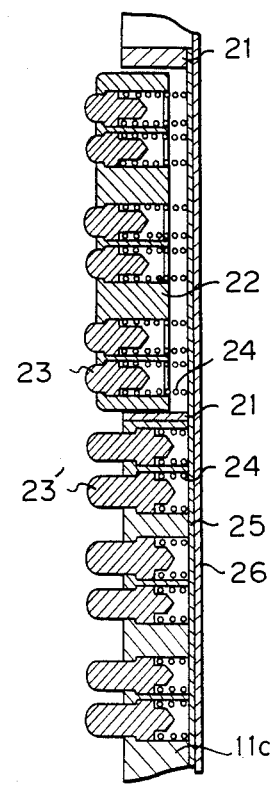
FIG. 17 is a partial vertical cross-sectional view similar to FIG. 10, illustrating the embodiment of FIG. 16; and, FIG. 18 is a partial rear view of a modified embodiment similar to that of FIG. 11.

FIGS. 16 and 17 illustrate an embodiment of this invention similar to the embodiment shown in FIGS. 9 and 10, wherein twelve contact pins 23 are arranged along a vertical line, the upper three pairs thereof consisting of six pins slidably mounted on a base member 22 and the lower three pairs thereof consisting of six pins directly and slidably mounted on the inner wall of the film chamber.

Figure 18:
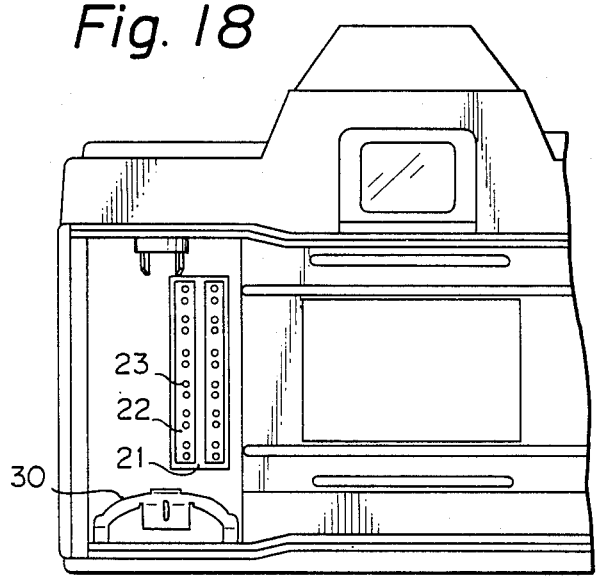

FIG. 18 is an embodiment of this invention similar to the embodiment shown in FIG. 11, wherein there are two slidable base members 22 each slidably carrying twelve contact pins 23 which are arranged along a vertical line and grouped into six pairs thereof. Therefore, in this embodiment, all twelve pairs of contact pins consisting of twenty-four contact pins can come into contact with the twelve code areas, respectively, on the film cartridge.

Figure 12:
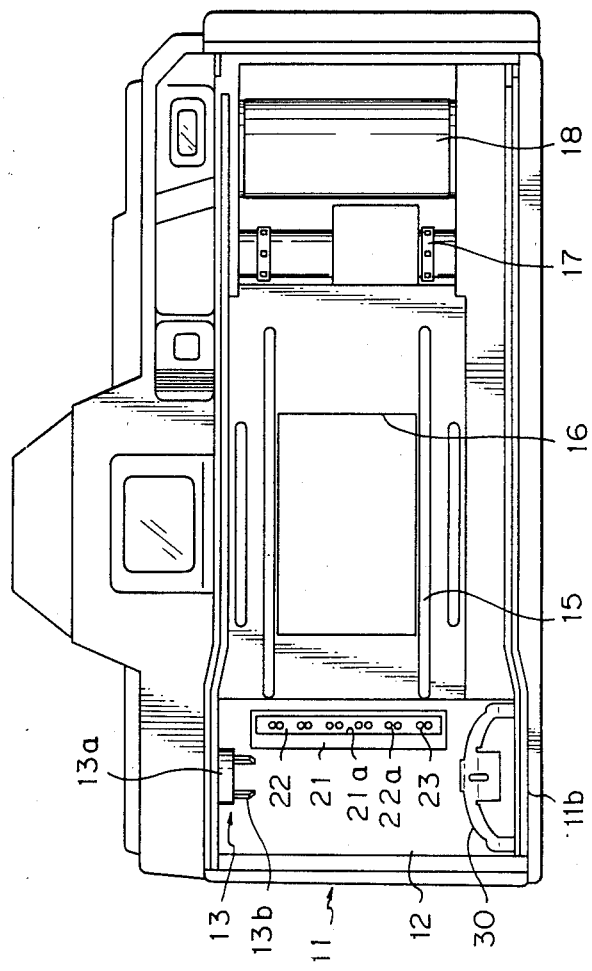
FIG. 12 is a rear view of a camera illustrating a modified embodiment similiar to FIG. 3.
Figure 12A:
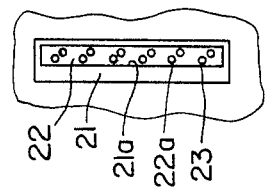
FIG. 12A shows a variant of FIG. 12 in which each pair of contact pins is arranged diagonally relative to the common code area.
Figure 13:
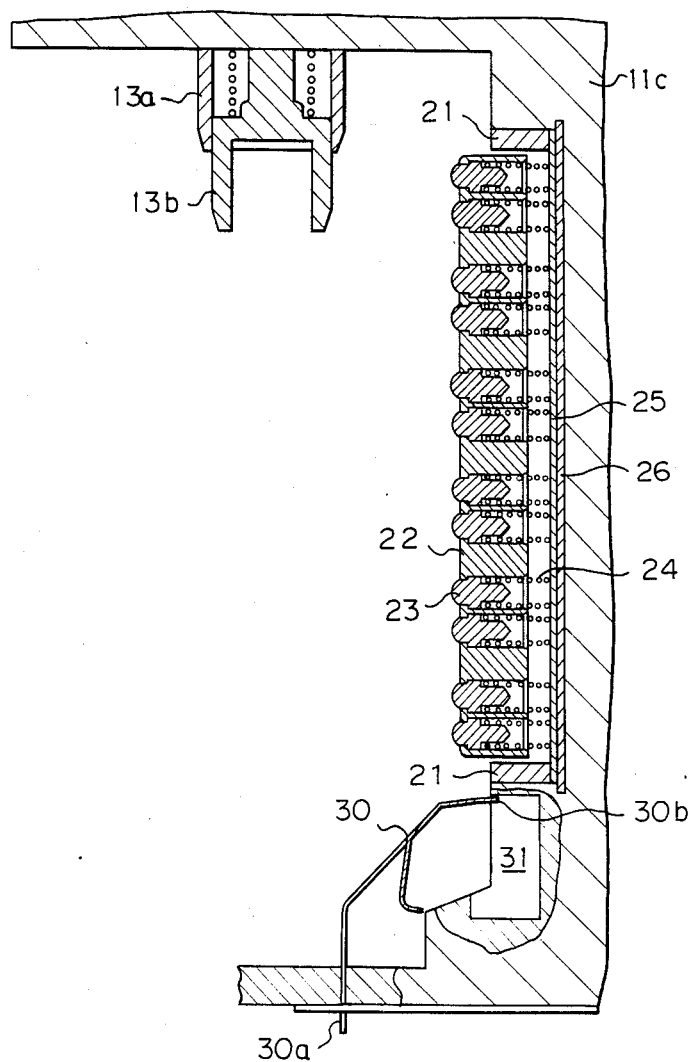
FIGS. 13, 14, and 15 are partial vertical cross-sectional views similar to FIGS. 6, 7, and 8, taken along lines A—A (at contact pins 23), B—B (at retraction hole 31, and C—C (at spring end 30a) in FIG. 4, and illustrating the film cartridge loading operation in the embodiment of FIG. 12.
Figure 14:
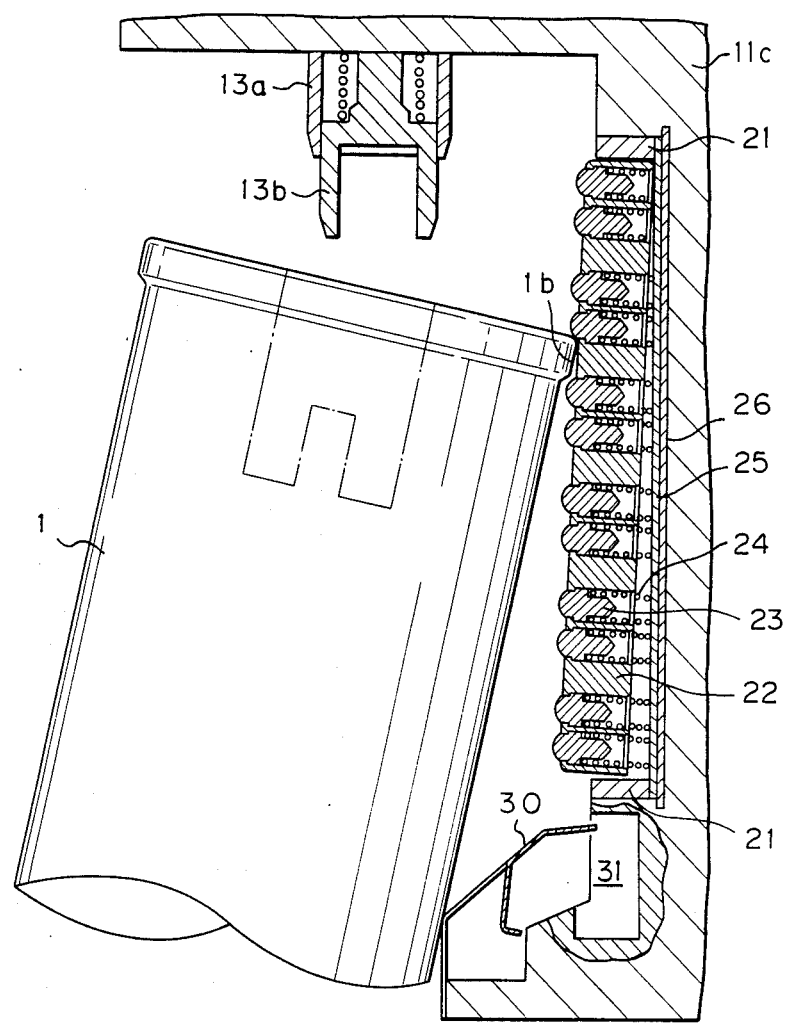
Figure 15:
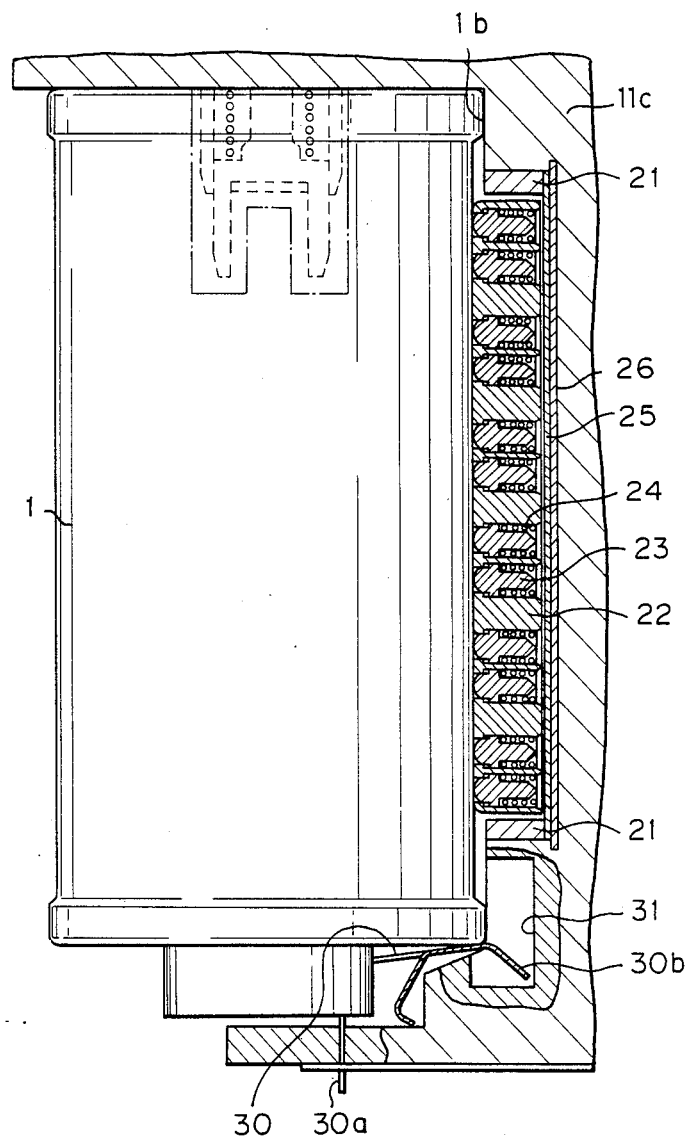

In the above-mentioned embodiments shown in FIGS. 12 through 19, although a pair of contact pins 23, which are intended to come into contact with a common code area on the film cartridge, are arranged along a vertical line, i.e., along the axial direction of the film chamber, these contact pins 23 can be otherwise arranged. Especially, if the code areas on the film cartridge are rectangular, it will be advantageous that each pair of contact pins 23 be arranged diagonally (See FIG. 12A) with respect to the common code area, since the distance between the two contact pins can be thus increased, thereby providing more space for mounting these contact pins 23. In addition, it will be expected that one of the pins advantageously covers the electrical contact, even if there is dust or foreign substances on the code area which may interfere with the electrical connection for the other contact pin.

We claim:

1. A film information reading device of a camera adapted for use with a film cartridge having on an outer periphery thereof a film information code pattern consisting of a combination of a plurality of conductive or insulated code areas, said device comprising:

means for defining a chamber for loading therein a film cartridge in a predetermined position, this means including a chamber wall having an opening opened toward the inside of the chamber;

a base member having an inside surface and slidably fitted within said opening, said base member being slidingly movable between a projected position at which said inside surface thereof is projected inwardly from the chamber wall by a certain distance and a retracted position at which said inside surface is retracted in said opening, said base member having a plurality of holes each extending in a sliding direction of said base member;

a plurality of contact members each having an inside end and slidably fitted within each of said plurality of holes, each said contact member being slidingly movable between a projected position at which said inside end is projected inwardly from the inside surface of the base member by a certain small distance and a retracted position at which said inside end is retracted in said hole;

means for urging said base member and said respective contact members toward their inwardly projected positions, so that the contact members come into contact with the respective corresponding code areas of the film information code pattern provided on the film cartridge when the latter is loaded in said chamber;

an electrical unit for reading the film information by detecting whether the contact members are in contact with the conductive or insulated code areas; and, means for electrically connecting said each contact member to said electrical unit.

2. A device as set forth in claim 1, wherein the distance by which said each contact member is projected, in its projected position, from the inside surface of the base member is smaller than the distance by which said base member is projected, in its projected position, from the film chamber wall.

3. A device as set forth in claim 2, wherein the inside end of said each contact member is round-shaped.

4. A device as set forth in claim 1, wherein said device further comprises a plate having an electrical conductive pattern formed thereon as a part of said electrical unit, said plate being situated in the camera at the opposite side of the film chamber with respect to said base member, and wherein said urging means comprises a plurality of conductive coil springs each located between said each contact member and said plate so as to urge said each contact member toward its projected position as well as to urge said base member toward its projected position via said contact member, and to electrically connect said each contact member to said electrical conductive pattern on said plate via said each spring.

5. A device as set forth in claim 2, wherein said base member has the same number of said holes, into which the contact members are slidably fitted, as the number of all the code areas provided on the film cartridge.

6. A device as set forth in claim 2, wherein said base member has less number of said holes, into which the contact members are slidably fitted, than the number of all the code areas provided on the film cartridge.

7. A device as set of forth in claim 2, wherein said base member has less number of said holes, into which the contact members are slidably fitted, than the number of all the code areas provided on the film cartridge, a remaining number of contact members are slidably fitted within respective holes directly provided in the cartridge chamber wall, so that said each contact member is slidably movable between its projected position, corresponding to the projected position of the first contact members carried on the base member, and its retracted position.

8. A device as set forth in claim 2, wherein a pair of said contact members, therefore, a pair of said holes, are provided for one of said code areas on the film cartridge, so that both the pair of contact members are in contact with the corresponding one of the code areas, when the film cartridge is loaded.

9. A device as set forth in claim 8, wherein the respective code areas on the film cartridge are rectangular, and a pair of said contact members, therefore a pair of said holes, are arranged on a diagonal line with respect to said rectangular code area so as to be away from each other.

* * * * *